United States Patent [19]

Shibayama

[11] Patent Number: 5,226,513
[45] Date of Patent: Jul. 13, 1993

[54] TORQUE CONVERTER LOCKUP CLUTCH CONTROL APPARATUS

[75] Inventor: Takashi Shibayama, Isehara, Japan

[73] Assignee: Nissan Motor Co., Ltd., Yokohama, Japan

[21] Appl. No.: 798,079

[22] Filed: Nov. 27, 1991

[30] Foreign Application Priority Data

Nov. 27, 1990 [JP] Japan ................................ 2-324466

[51] Int. Cl.⁵ ...................... F16H 61/14; F16H 45/02; B60K 41/02
[52] U.S. Cl. ................ 192/0.032; 192/0.075; 192/3.3
[58] Field of Search ............. 192/0.032, 0.075, 0.076, 192/0.096, 3.29, 3.3, 3.31; 74/890

[56] References Cited

U.S. PATENT DOCUMENTS

| | | | |
|---|---|---|---|
| Re. 33,713 | 10/1991 | Watanabe et al. | 192/0.032 |
| 4,457,411 | 7/1984 | Hiramatsu | 192/0.076 |
| 4,468,988 | 9/1984 | Hiramatsu | 74/890 X |
| 4,582,185 | 4/1986 | Grimes et al. | 192/0.076 |
| 4,585,101 | 4/1986 | Danno | 192/3.31 |
| 4,724,939 | 2/1988 | Lockhart et al. | 192/3.3 |
| 4,957,194 | 9/1990 | Sawa et al. | 192/0.096 |

FOREIGN PATENT DOCUMENTS

| | | | |
|---|---|---|---|
| 57-157860 | 9/1982 | Japan | 192/3.31 |
| 57-163732 | 10/1982 | Japan | |
| 57-177427 | 11/1982 | Japan | 192/0.075 |
| 58-42861 | 3/1983 | Japan | |
| 59-51145 | 3/1984 | Japan | |
| 59-89861 | 5/1984 | Japan | |
| 60-60039 | 4/1985 | Japan | |
| 61-136057 | 6/1986 | Japan | |

Primary Examiner—Richard M. Lorence
Attorney, Agent, or Firm—Foley & Lardner

[57] ABSTRACT

A torque converter lockup clutch control apparatus operates a lockup clutch to provide a controlled degree of slip between the converter cover and the turbine hub. Cylinder output sensors are provided for monitoring outputs produced in the respective cylinders of an internal combustion engine. The monitored cuylinder outputs are utilized to calculate the amplitude of fluctuation of the torque outputted from the engine. The degree of slip provided in the lockup clutch is changed when the calculated amplitude exceeds a predetermined value.

9 Claims, 9 Drawing Sheets

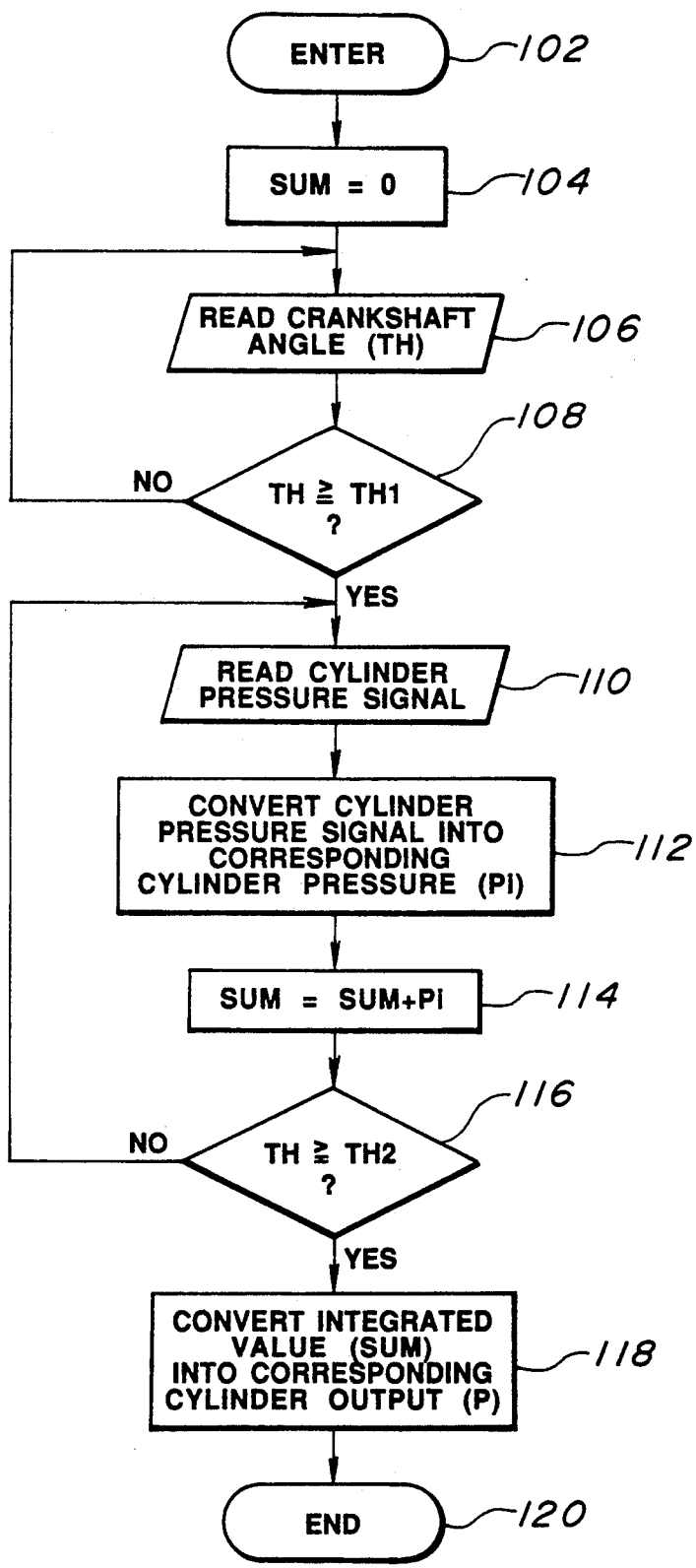

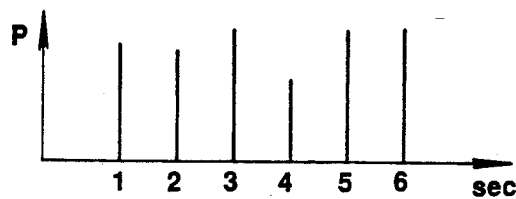
FIG. 9A
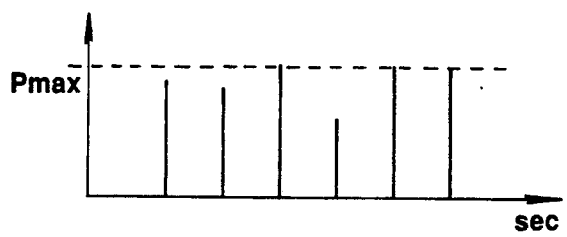
FIG. 9B
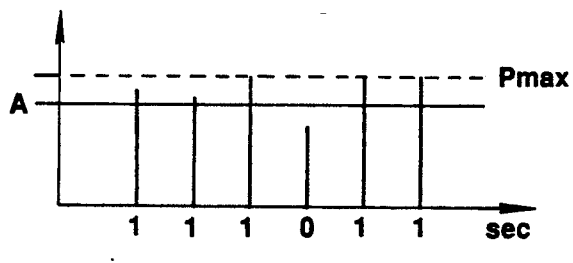
FIG. 9C
FIG. 10
| D | PATTERN |
|---|---|
| 1.5 | 1 0 1 0 1 0<br>0 1 0 1 0 1 |
| 0.5 | 1 1 1 1 1 0<br>1 1 0 0 1 1<br>0 0 0 1 1 1<br>: : : : : : |
| 0 | 1 1 1 1 1 1 |
| ERROR | 0 0 0 0 0 0 |

FIG.12

| ΔT \ f0 | 10 | 11 | 12 | 13 | 14 | 15 | 16 | 17 | 18 |
|---|---|---|---|---|---|---|---|---|---|
| 0.1 | 70 | 70 | 70 | 80 | 90 | 80 | 70 | 70 | 70 |
| 0.2 | 70 | 70 | 80 | 90 | 100 | 90 | 80 | 70 | 70 |
| 0.3 | 70 | 80 | 90 | 100 | 110 | 100 | 90 | 80 | 70 |
| 0.4 | 80 | 90 | 100 | 110 | 120 | 110 | 100 | 90 | 80 |
| 0.5 | 90 | 100 | 110 | 120 | 130 | 120 | 110 | 100 | 90 |
| 0.6 | 100 | 110 | 120 | 130 | 140 | 130 | 120 | 110 | 100 |
| 0.7 | 110 | 120 | 130 | 140 | 150 | 140 | 130 | 120 | 110 | f1 ... f2

FIG.13

| ΔT \ f0 | 50 | 51 | 52 | 53 | 54 | 55 | 56 | 57 | 58 |
|---|---|---|---|---|---|---|---|---|---|
| 0.1 | ○ | ○ | ○ | × | × | ○ | ○ | ○ | ○ |
| 0.2 | ○ | ○ | × | × | × | × | ○ | ○ | ○ |
| 0.3 | ○ | ○ | × | × | × | × | × | ○ | ○ |
| 0.4 | ○ | × | × | × | × | × | × | × | ○ |
| 0.5 | × | × | × | × | × | × | × | × | × | f3 ... f4

○ = PERMITTED   × = NOT PERMITTED

TORQUE CONVERTER LOCKUP CLUTCH CONTROL APPARATUS

BACKGROUND OF THE INVENTION

This invention relates to a torque converter lockup clutch control apparatus for use with an automotive vehicle having a multi-cylinder type internal combustion engine.

Torque converter lockup clutch control apparatus have been proposed, for example, in Japanese Patent Kokai Nos. 57-163732, 59-89861 and 61-136057, to reduce undesirable sounds sympathetic with vibrations excited by engine output torque fluctuation. The engine output torque fluctuation includes two components. The first component is induced by successive complete combustions in the engine and it excites a high degree of force which vibrates the vehicle at a frequency ranging from about 50 Hz to about 58 Hz. This vibration frequency, which corresponds to the time interval between the successive combustions in the engine, tends to cause a sympathetic sound. The second component is induced with incomplete combustion taking place in one or more engine cylinders and it excites a low degree of force which vibrates the vehicle at a frequency ranging from about 10 Hz to about 18 Hz. This vibration frequency, which corresponds to the time intervals at which incomplete combustion takes place, tends to cause a judder.

Although the conventional lockup clutch control apparatus are sufficient to reduce the sympathetic sound caused by the first component of the engine torque fluctuation induced when the engine is operating with complete combustion taking place in all of the engine cylinders, they cannot reduce the judder and sympathetic sound caused by the second component of the engine torque fluctuation induced when the engine is operating with incomplete combustion taking place in one or more engine cylinders.

SUMMARY OF THE INVENTION

A main object of the invention is to provide a torque converter lockup clutch control apparatus which can obviate vibrations resulting from engine output torque fluctuations induced when the engine is operating with different efficiencies of combustions taken place in the respective engine cylinders.

It is another object of the invention to provide a torque converter lockup clutch control apparatus which can obviate judder resulting from engine output torque fluctuations when the lockup clutch is operating in a slip lockup mode permitting a controlled degree of slip therein.

It is still another object of the invention to provide a torque converter lockup clutch control apparatus which can obviate undesirable sounds sympathetic with engine output torque fluctuations when the lockup clutch is operating in a complete lockup mode providing a complete mechanical connection.

There is provided, in accordance with the invention, an apparatus for controlling a lockup clutch provided in an automatic transmission of an automotive vehicle including an internal combustion engine having a plurality of cylinders. The apparatus comprises cylinder output sensors provided for the respective engine cylinders. Each of the engine cylinder output sensors includes means sensitive to a cylinder output in the corresponding one of the engine cylinders for producing a sensor signal indicative of a sensed cylinder output level. The apparatus also includes a control unit coupled to the cylinder output sensors for operating the lockup clutch to provide a controlled degree of slip therein. The control unit includes means responsive to the sensor signals from the respective cylinder output sensors for calculating an amplitude of engine output torque fluctuation resulting from different combustion efficiencies in the engine cylinders, and means for changing the degree of slip provided in the lockup clutch when the calculated amplitude exceeds a predetermined value.

In one aspect of the invention, the control unit includes means responsive to the sensor signals from the respective cylinder output sensors for calculating a frequency of the engine output torque fluctuation, means producing a command signal when the calculated frequency is in a predetermined range tending to excite vibrations on the vehicle with the lockup clutch being operated in a slip lockup mode permitting a controlled degree of slip therein, and means responsive to the command signal for changing the degree of slip permitted in the lockup clutch.

In another aspect of the invention, the control unit includes means responsive to the sensor signals from the respective cylinder output sensors for calculating a frequency of the engine output torque fluctuation, means producing a command signal when the calculated frequency is in a predetermined range tending to excite vibrations on the vehicle with the lockup clutch being operated in a complete lockup mode providing a complete mechanical connection therein, and means responsive to the command signal for shifting the lockup clutch from the complete lockup mode into a slip lockup mode permitting a controlled degree of slip in the lockup clutch.

BRIEF DESCRIPTION OF THE INVENTION

This invention will be described in greater detail by reference to the following description taken in connection with the accompanying drawings, in which:

FIG. 4 is a flow diagram showing the programming of the digital computer as it is used to calculate the engine cylinder output obtained in each of the engine cylinders;

FIGS. 9A to 9C are diagrams used in explaining the manner of providing an engine cylinder output variance pattern;

FIG. 10 is a diagram showing a relationship used in calculating the degree of fluctuation of the engine output torque;

FIG. 12 is diagram showing a relationship used in calculating an appropriate degree of slip permitted in the lockup clutch;

FIG. 13 is a diagram showing a relationship used in determining whether the complete lockup mode is permitted;

DETAILED DESCRIPTION OF THE INVENTION

Figure 1:
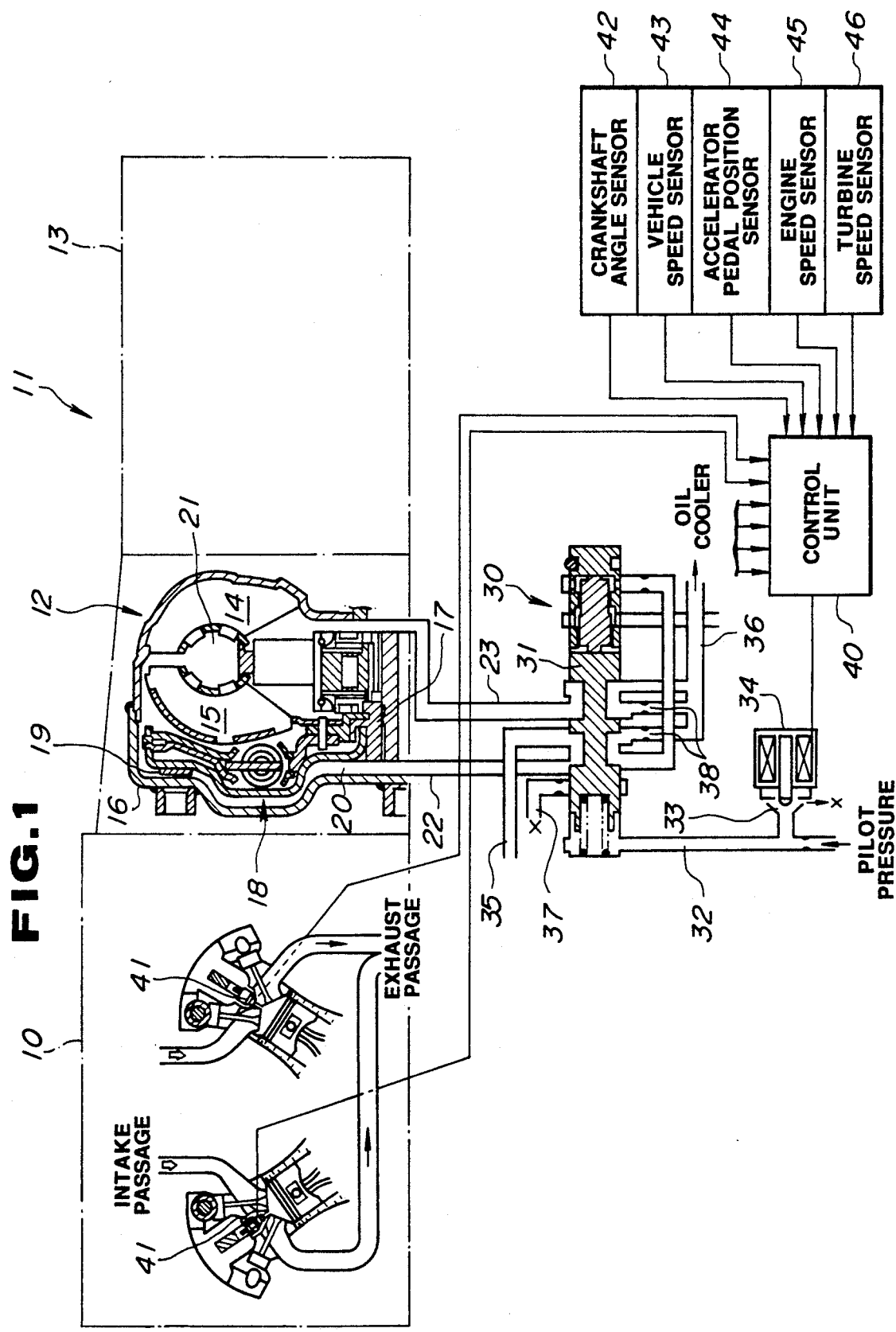
FIG. 1 is a schematic diagram showing one embodiment of a torque converter lockup clutch control apparatus made in accordance with the invention.

With reference to the drawings and in particular to FIG. 1, there is shown a schematic diagram of a lockup clutch control apparatus embodying the invention. The lockup clutch control apparatus is used in an automotive vehicle having a multi-cylinder type internal combustion engine 10 and an automatic transmission 11 provided with a lockup mechanism. Although the engine 10 as illustrated in FIG. 1 shows only two cylinders, nevertheless it should be understood that the particular lockup valve control apparatus described herein is designed for use on a V-six engine. Thus, it should be understood that there are at a total of six cylinders. The automatic transmission 11 includes a three-element, two-phase torque converter 12 and an auxiliary transmission unit 13. The torque converter 12 includes an impeller 14 and a turbine 15 arranged in fluid flow relationship. The torque converter 12 has a converter cover 16 drivingly connected to the engine crankshaft (not shown) of the engine 10 and a turbine hub 17 drivingly connected through a transmission input shaft to the auxiliary transmission unit 13.

A torque converter lockup clutch 18 is splined to the turbine hub 17 and carries a friction surface 19, located at its radially outer end, to drivingly engage the torque converter cover 16. The lockup clutch 18 defines a chamber 20 along with the torque converter cover 16. The chamber 20 is connected at its one end to a conduit 22 and at the other end thereof to a converter chamber 21 which in turn is connected to a conduit 23. The lockup clutch 18 is closed, locked, applied or engaged to complete a mechanical connection between the impeller 14 and the turbine 15 when pressurized hydraulic fluid, contained in the converter chamber 21, forces friction surface 19 against the torque converter cover 16. This lockup clutch operation mode is referred to as a complete lockup mode. The lockup clutch 18 can operate in a slip lockup mode to provide a mechanical connection with a controlled degree of slip permitted between the impeller 14 and the turbine 15. The lockup clutch 18 is opened, unlocked, released or disengaged so that a hydrodynamic driving connection exists between the impeller 14 and the turbine 15 when pressurized hydraulic fluid is supplied through the chamber 20 between the converter cover 16 and the friction surface 19 of the lockup clutch 18 to disengage these surfaces. This lockup clutch operation mode is referred to as a released lockup mode.

A hydraulic control valve 30 is provided for controlling application and release of the lockup clutch 18 in response to pressurized hydraulic fluid supplied from a source of pressurized hydraulic pressure through a conduit 32 having a drain port 33. A solenoid-operated valve 34 is provided in cooperation with the drain port 33 and it controls the amount of pressurized hydraulic fluid discharged through the drain port 33 from the conduit 32. The hydraulic control valve 30 has a valve spool 31 placed for movement between two positions. The first position, illustrated in FIG. 1, is occupied when pressurized hydraulic fluid is supplied through the conduit 32. At the first position, the hydraulic control valve 30 connects the conduit 22 to a conduit 35 leading to a source of pressurized hydraulic fluid and the conduit 23 to a drain conduit 36 leading to an oil cooler so that the lockup clutch 18 is retained in its released position. The hydraulic control valve 30 occupies the second position, its leftmost position, as viewed in FIG. 1, when the pressurized hydraulic fluid is released through the drain port 33 from the conduit 32. At the second position, the hydraulic control valve 30 connects the conduit 20 to a drain conduit 37 and the conduit 23 to the conduit 35 so that the lockup clutch 18 is retained in its applied position. The numeral 38 designates orifices.

Figure 2:
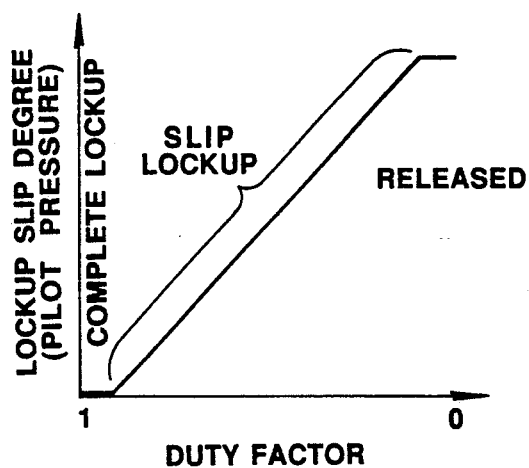
FIG. 2 is a graph showing the change in the degree of slip permitted in the lockup clutch as a function of duty factor.

The solenoid-operated valve 34 may be of the conventional type having a plunger spring-urged to close the drain port 33, and an electrical winding electromagnetically coupled to extract the plunger so as to open the drain port 33 when the electrical winding is energized by the presence of electrical current within it. The length of the electrical pulse, that is, the pulse-width, applied to the electrical winding of the solenoid-operated valve 34 determines the length of time the solenoid-operated valve 34 opens the drain port 33 and, thus, determines the degree to which the pressure charged in the conduit 32 decreases. It is, therefore, possible to provide a desired degree of slip in the lockup clutch 18 operating to provide a mechanical connection between the impeller 14 and the turbine 15 by controlling the duty factor of the electric pulse signal applied to the solenoid-operated valve 34. FIG. 2 shows the change in slip degree permitted in the lockup clutch 18 as a function of duty factor. As can be seen from FIG. 2, the lockup clutch 18 provides a complete mechanical connection between the impeller 14 and the turbine 15 when the duty factor is at or near 1. The mechanical connection is fully released when the duty factor is at or near zero.

The duty ratio of the electrical pulse signal applied to the solenoid valve 34 is determined from calculations performed by a digital computer, these calculations being based upon various conditions of the automotive vehicle that are sensed during its operation. These sensed conditions include cylinder output, crankshaft position, vehicle speed, accelerator pedal position, engine speed, and turbine speed. Thus, cylinder output sensors 41, a crankshaft position sensor 42, a vehicle speed sensor 43, an accelerator pedal position sensor 44, an engine speed sensor 45, and a turbine speed sensor 46 are connected to the control unit 40.

Figure 3:
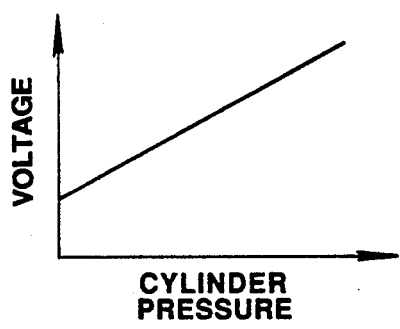
FIG. 3 is a graph of voltage versus cylinder pressure provided by a cylinder output sensor.

The cylinder output sensors 41 are provided on the respective engine cylinders. Each of the cylinder pressure sensors 41 monitors the output of the corresponding engine cylinder and produces a sensor signal indicative of a sensed cylinder output level. Preferably, each of the cylinder output sensors 41 may be taken in the form of a cylinder pressure sensor which monitors the pressure in the corresponding engine cylinder and produces a sensor signal indicative of a sensed cylinder pressure level, as shown in FIG. 3. For example, the cylinder pressure sensor 41 may be of the type utilizing a piezoelectric element, such as a pressure-to-resistance converter, a pressure-to-electrostatic capacity converter, or the like. One example of a cylinder pressure sensor suitable for use with this invention is disclosed in an article "SAE Paper 890758", pp. 79–80. The crankshaft position sensor 42 produces a series of crankshaft position electrical pulses each corresponding to one or two degrees of rotation of the engine crankshaft and a series of reference electrical pulses at a predetermined number of degrees before the top dead center position of each engine piston. The vehicle speed sensor 43 produces a signal corresponding to the speed of running of the automotive vehicle. The accelerator pedal position sensor 44 produces a signal when the degree of depression of the accelerator pedal exceeds a predetermined value. The engine speed sensor 45 produces a signal corresponding to the speed of running of the engine 10. The turbine speed sensor 46 produces a signal corresponding to the speed of running of the turbine 15.

The control unit 40 may comprise a digital computer which includes a central processing unit (CPU), a random access memory (RAM), a read only memory (ROM), and an input/output control unit (I/O). The central processing unit communicates with the rest of the computer via data bus. The input/output control unit includes an analog-to-digital converter which receives analog signals from the various sensors and it converts the received signals into corresponding digital signals for application to the central processing unit. The read only memory contains the programs for operating the central processing unit and further contains appropriate data in look-up tables used in calculating an appropriate value for the duty factor of the control signal applied to the solenoid-operated value 34. A control word specifying a desired duty factor is transferred by the central processing unit to a solenoid valve control circuit which converts it into a control signal to the solenoid-operated valve 34 for controlling the degree of slip permitted in the lockup clutch 18.

FIG. 4 is a flow diagram illustrating the programming of the digital computer as it is used to calculate the engine cylinder output P obtained in each of the six engine cylinders. The computer program is entered at the point 102 at uniform intervals of time or engine crankshaft angle. At the point 104 in the program, the integrated value SUM stored in the computer memory is initialized to zero. At the point 106 in the program, the existing engine crankshaft angle TH is read into the computer memory. At the point 108 in the program, a determination is made as to whether or not the read engine crankshaft angle TH is equal to or greater than a first predetermined value TH1. If the answer to this question is "yes", then the program proceeds to the point 110. Otherwise, the program is returned to the point 106. This operation is repeated until the engine crankshaft angle reaches the first predetermined value TH1.

At the point 110 in the program, the cylinder pressure signal is converted to digital form and read into the computer memory. At the point 112 in the program, the read value of the cylinder pressure signal is converted into a corresponding cylinder pressure value Pi. At the point 114 in the program, the central processing unit calculates a new integrated value by adding the converted cylinder pressure value Pi to the last integrated value SUM stored in the computer memory. The new integrated value is used to update the last integrated value SUM. At the point 116 in the program, a determination is made as to whether or not the engine crankshaft angle read at the point 106 is equal to or greater than a second predetermined value TH2 greater than the first predetermined value TH2. If the answer to this question is "yes", then the program proceeds to the point 118. Otherwise, the program is returned to the point 110. This operation is repeated until the engine crankshaft angle reaches the second predetermined value TH2. At the point 118 in the program, the integrated value SUM stored in the computer memory is converted into a corresponding engine cylinder output P. Following this, the program proceeds to the end point 120.

Figure 5:
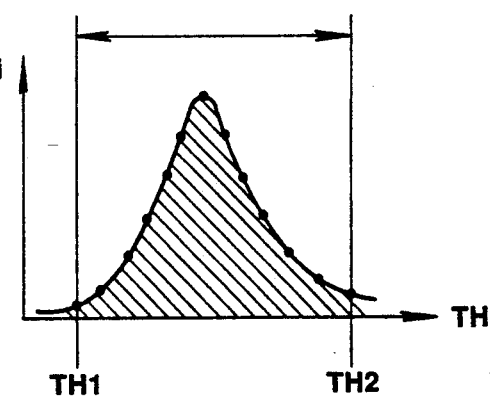
FIG. 5 is a graph of cylinder pressure versus engine crankshaft angle.

The engine cylinder pressure Pi is sampled repetitively at uniform intervals when the engine crankshaft angle is in a predetermined range defined by the first and second values TH1 and TH2. The sampled engine cylinder pressure values are summed or integrated to calculate an engine cylinder output P. The calculated engine cylinder output P is indicated by the hatched area in FIG. 5. A similar program is executed for each of the other engine cylinders.

Figure 6:
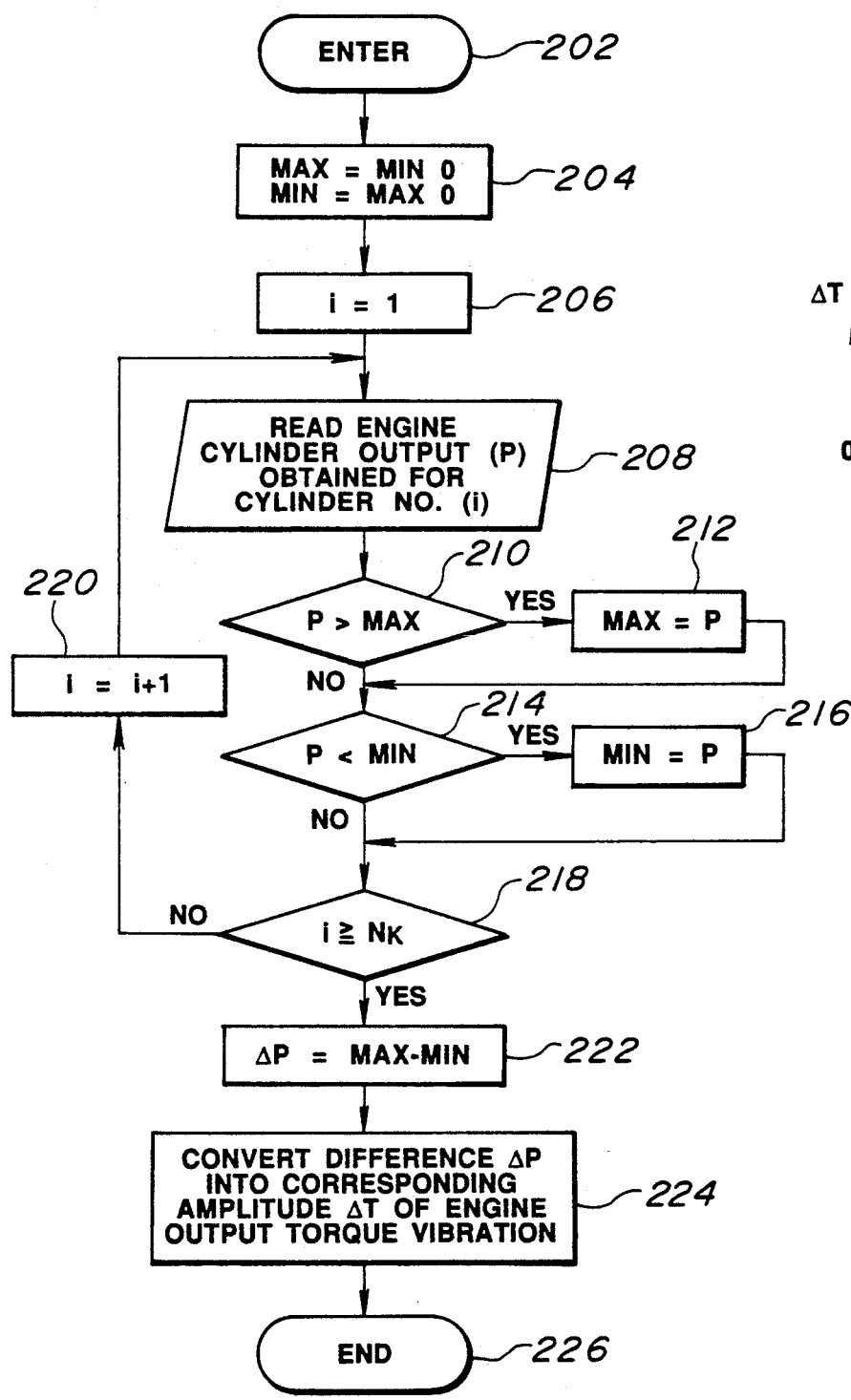
FIG. 6 is flow diagram showing the programming of the digital computer as it is used to calculate the amplitude of fluctuation of the engine output torque.

FIG. 6 is a flow diagram illustrating the programming of the digital computer as it is used to calculate the amplitude $\Delta T$ of fluctuation of the engine output torque. The computer program is entered at the point 202. At the point 204 in the program, the central processing unit initializes the maximum engine cylinder output value MAX stored in the computer memory to a minimum real number MINO usable in the computer and the minimum engine cylinder output value MIN stored in the computer memory to a maximum real number MAXO usable in the computer. At the point 206 in the program, the cylinder number i is initialized to 1.

At the point 208 in the program, the engine cylinder output value P calculated at the point 118 of the program of FIG. 4 for the engine cylinder No. i is read. At the point 210 in the program, a determination is made as to whether or not the engine cylinder output value P read at the point 208 is greater than the maximum engine cylinder output value MAX. If the answer to this question is "yes", then the program proceeds to the point 212 where the maximum engine cylinder output value MAX is replaced with the engine cylinder output value P and then to the point 214. Otherwise, the program proceeds directly to the point 214. At the point 214 in the program, a determination is made as to whether or not the engine cylinder output value P read at the point 208 is less than the minimum engine cylinder output value MIN. If the answer to this question is "yes", then the program proceeds to the point 216 where the minimum engine cylinder output value MIN is replaced with the engine cylinder output value P and then to the point 218. Otherwise, the program proceeds directly to the point 218. At the point 218 in the program, a determination is made as to whether or not the cylinder number i is equal to or greater than the total number Nk (in this case six) of the cylinders provided for the engine. If the answer to this question is "no", then the program proceeds to the point 220 where the cylinder number i is incremented by one and then to the point 208. If the answer to the question is "yes", then it means that maximum and minimum engine cylinder output values MAX and MIN have been obtained for all of the engine cylinders and the program proceeds to the point 222.

Figure 7:
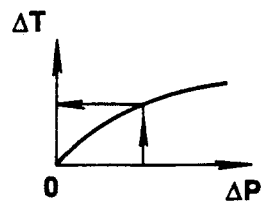
FIG. 7 is a graph of engine output change versus engine output torque fluctuation amplitude.

At the point 222 in the program, the central processing unit calculates a difference $\Delta P$ of the minimum engine cylinder output value MIN from the maximum engine cylinder output value MAX. At the point 224 in the program, the central processing unit calculates an amplitude $\Delta T$ of fluctuation of the engine output torque from a relationship programmed into the computer. This relationship is shown in FIG. 7 and it defines engine output torque fluctuation amplitude $\Delta T$ as a function of difference $\Delta P$. The central processing unit may be programmed in a known manner to interpolate between the data at different entry points if desired. Following this, the program proceeds to the end point 226.

Figure 8:
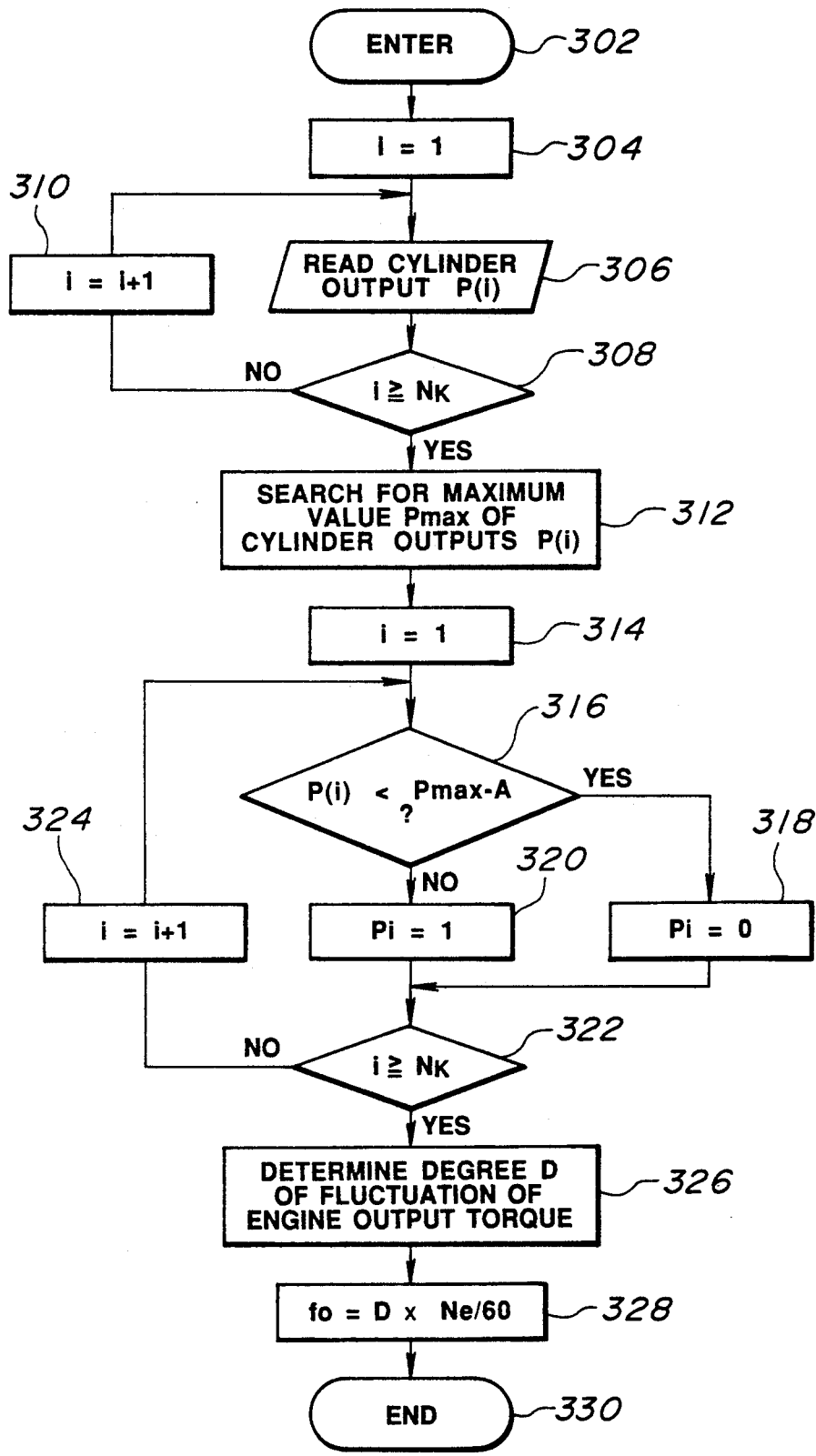
FIG. 8 is flow diagram showing the programming of the digital computer as it is used to calculate the frequency of fluctuation of the engine output torque.

FIG. 8 is a flow diagram illustrating the programming of the digital computer as it is used to calculate the frequency of fluctuation of the engine output torque. The computer program is entered at the point 302. At the point 304 in the program, the cylinder number i is initialized to 1. At the point 306 in the program, the engine cylinder output P calculated for the engine cylinder no. i is read. At the point 308 in the program, a determination is made as to whether or not the cylinder number i is equal to or greater than the total number Nk (in this case six) of the cylinders provided for the engine. If the answer to this question is "no", then the program proceeds to the point 310 where the cylinder number i is incremented by one and then to the point 306. This operation is repeated until the cylinder number i reaches the value Nk so that the central processing unit stores six output values P(i) sampled for the respective engine cylinders during two cycles of rotation of the engine, as shown in FIG. 9A. If the answer to the question inputted at the point 308 is "yes", it means that the engine cylinder output values P(i) for all of the engine cylinders have been read and the program proceeds to the point 312. At the point 312 in the program, the central processing unit searches for the maximum value(s) Pmax of the read engine cylinder output values P(i), as shown in FIG. 9B.

At the point 314 in the program, the cylinder number i is initialized to 1. At the point 316 in the program, a determination is made as to whether or not the engine cylinder output value P(i) read for the cylinder number i is less than the maximum cylinder output value Pmax minus a predetermined value A. If the answer to this question is "yes", then the program proceeds to the point 318 where the read cylinder output value P(i) is set to zero, as shown in FIG. 9C, and then to the point 322. Otherwise, the program proceeds to the point 320 where the read cylinder output value P(i) is set to 1, as shown in FIG. 9C, and then to the point 322. At the point 322 in the program, a determination is made as to whether or not the cylinder number i is equal to or greater than the number Nk (in this case six) of the cylinders provided for the engine. If the answer to this question is no, then the program proceeds to the point 324 where the cylinder number i is incremented by one and then to the point 316. This operation is repeated until the cylinder number i reaches the value Nk to store an engine cylinder output variance pattern, as shown in FIG. 9C. If the answer to the question inputted at the point 322 is "yes", it means that an engine cylinder output variance pattern has been completed and the program proceeds to the point 326.

At the point 326 in the program, the central processing unit determines a degree D of fluctuation of the engine output torque from a relationship programmed into the computer. This relationship is shown in FIG. 10 and it includes a set of reference patterns for comparison with the engine cylinder output variance pattern. At the point 328 in the program, the central processing unit calculates the frequency fo of fluctuation of the engine output torque as $fo = D \times Ne/60$ where Ne is the engine speed. Following this, the program proceeds to the end point 330.

Figure 11:
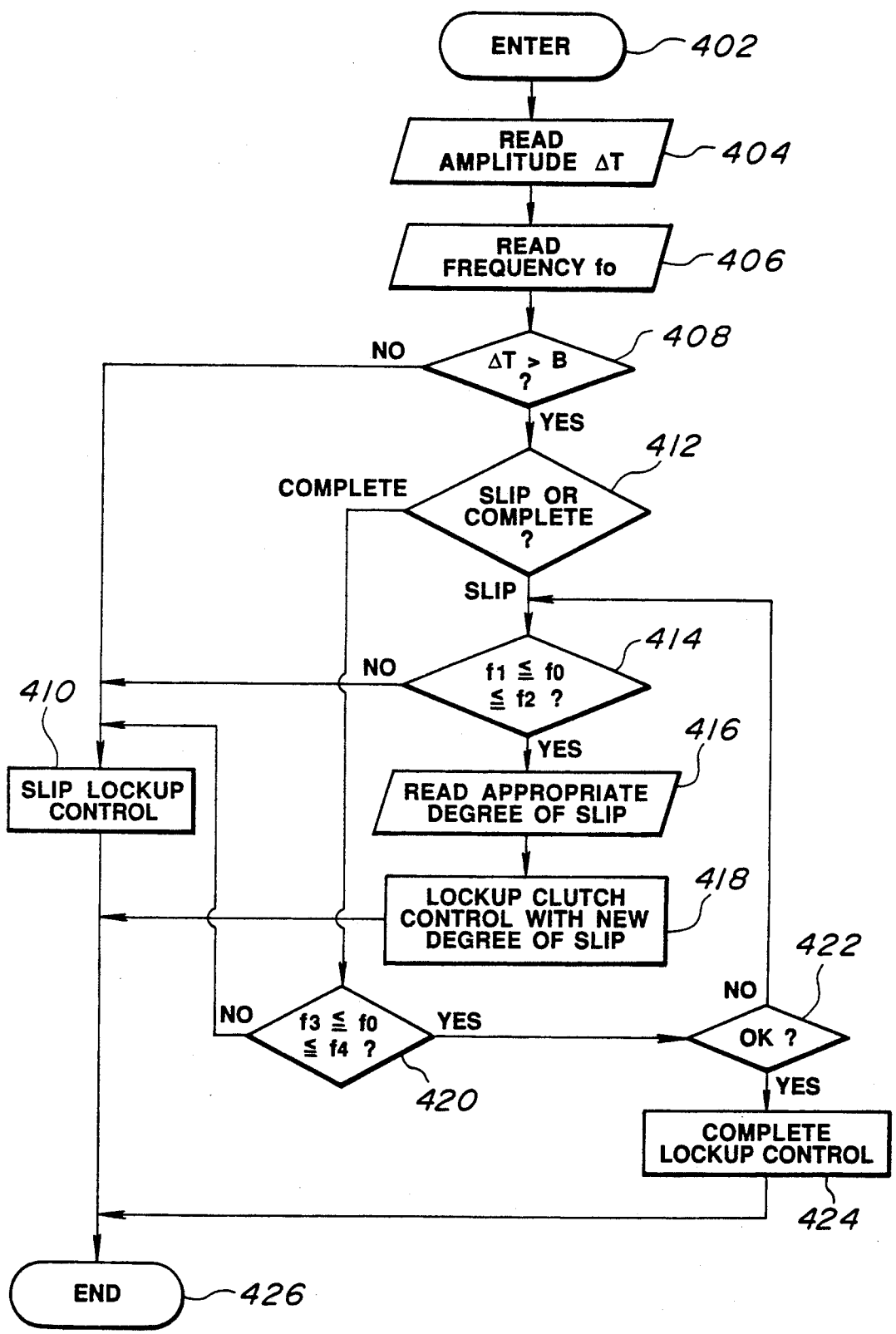
FIG. 11 is flow diagram showing the programming of the digital computer as it is used to control the torque converter lockup clutch.

FIG. 11 is a flow diagram illustrating the programming of the digital computer as it is used to control the lockup clutch. The computer program is entered at the point 402. At the point 404 in the program, the central processing unit reads the amplitude $\Delta T$ calculated at the point 224 of the program of FIG. 6. At the point 406 in the program, the central processing unit reads the frequency fo calculated at the point 328 of the program of FIG. 8. At the point 408 in the program, a determination is made as to whether or not the read amplitude $\Delta T$ is greater than a predetermined value B. If the answer to this question is "no", then the program proceeds to the point 410 where the central processing unit produces a command causing the solenoid-operated value 34 to operate the lockup clutch 18 in the slip lockup mode and then to the end point 426. If the read amplitude $\Delta T$ is greater than the predetermined value B, then it means incomplete combustion is taken place in one or more engine cylinders to provide different combustion efficiencies and the program proceeds from the point 408 to another determination step at the point 412. This determination is as to whether the lockup clutch 18 is operating in a complete or slip lockup mode. This determination is made based upon the duty factor of the control signal applied to the solenoid-operated valve 34.

If the lockup clutch 18 is operating in a slip lockup mode, then the program proceeds from the point 412 to another determination step at the point 414. This determination is as to whether or not the read frequency fo is in a first (or judder frequency) range of f1 (for example, 10 Hz) to f2 (for example, 18 Hz). If the answer to this question is "no", then it means that there exists no danger of judder and the program proceeds to the point 410. If the read frequency fo is in the first range, then the program proceeds from the point 414 to the point 416 where the central processing unit calculates an optimum degree of slip permitted in the lockup clutch 18 from a relationship programmed into the computer. This relationship is shown in FIG. 12 and it defines slip degree as a function of amplitude $\Delta T$ and frequency fo. As can be seen from FIG. 12, the slip degree increases as the amplitude $\Delta T$ increases and as the frequency fo is closer to the center (14 Hz) of the judder frequency range. At the point 418 in the program, the central processing unit produces a command causing the solenoid-operated valve 34 to provide the calculated degree of slip between the impeller 14 and the turbine 15 in order to avoid judder. For this purpose, the central processing unit calculates an appropriate value for the duty factor of the control signal applied to the solenoid-operated value 34 based upon the slip degree calculated at the point 416. Following this, the program proceeds to the end point 426.

If the lockup clutch 18 is operating in a complete lockup mode, then the program proceeds from the point 412 to another determination step at the point 420. This determination is as to whether or not the read frequency fo is in a second (or sympathetic sound frequency) range of f3 (for example, 50 Hz) to f4 (for example, 58 Hz). If the answer to this question is "no", then it means that there is no danger of sympathetic sound and the program proceeds to the point 410. If the read frequency fo is in the second range, then the program proceeds from the point 420 to another determination step at the point 422. This determination is as to whether a complete lockup mode is permitted. This determination is made from a relationship programmed into the computer. This relationship is shown in FIG. 13 and it specifies the answer as a function of amplitude ΔT and frequency fo. As can be seen from FIG. 13, the complete lockup mode is not permitted regardless of the read amplitude ΔT when the read frequency fo is at the center (53 Hz and 54 Hz) of the sympathetic sound frequency range. The possibility of the complete lockup mode being retained increases as the read amplitude ΔT decreases and the difference between the read frequency fo and the center of the sympathetic sound frequency range increases. If the answer to this question is "yes", then the program proceeds to the 424 where the central processing unit produces a command causing the lockup clutch 18 to operate in a complete lockup mode in order to avoid undesirable sympathetic sound and then to the end point 426. Otherwise, the program is returned to the point 414.

The lockup clutch control apparatus calculates the amplitude ΔT of fluctuation of the engine output torque resulting from incomplete combustion in one or more engine cylinders or different combustion efficiencies in the respective engine cylinders. When the calculated amplitude ΔT exceeds a predetermined value B, the degree of slip permitted in the lockup clutch 18 is changed to increase the damping function of the lockup clutch 18 so as to smooth the vibrations excited by the engine output torque fluctuation. This is effective to avoid vibrations excited by the engine output torque fluctuation.

Figure 14:
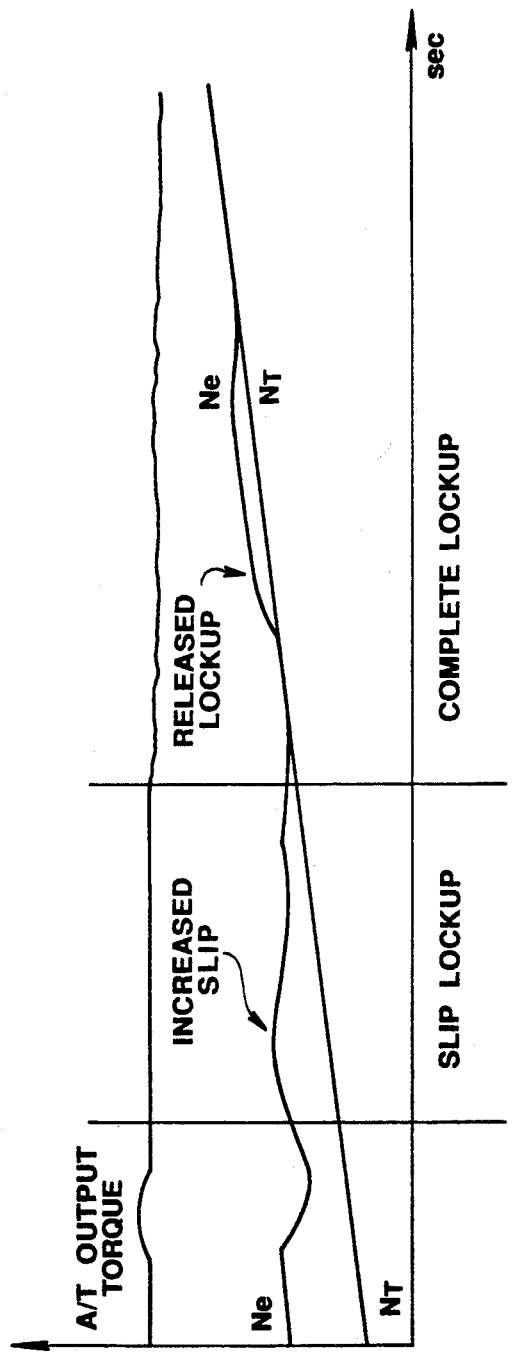
FIG. 14 is a graph used in explaining the effects of the torque converter lockup clutch control apparatus of the invention.

The frequency fo of fluctuation of the engine output torque resulting from incomplete combustion in one or more engine cylinders or different combustion efficiencies in the respective engine cylinders is calculated. When the calculated frequency fo is in a first range tending to excite judder on the vehicle with the lockup clutch being operating in the slip lockup mode, the degree of slip provided in the lockup clutch is increased to increase the damping function of the lockup clutch 18 so as to smooth fluctuations in the torque outputted from the automatic transmission (A/T), as shown in FIG. 14. This is effective to obviate the judder.

When the calculated frequency fo is in a second range tending to excite undesirable sympathetic sounds on the vehicle with the lockup clutch being operating in the complete lockup mode, the lockup clutch is shifted from the complete lockup mode to the slip lockup mode to increase the damping function of the lockup clutch 18 so as to smooth fluctuations in the output torque outputted from the automatic transmission, as shown in FIG. 14. This is effective to obviate the sympathetic sound.

Figure 15:
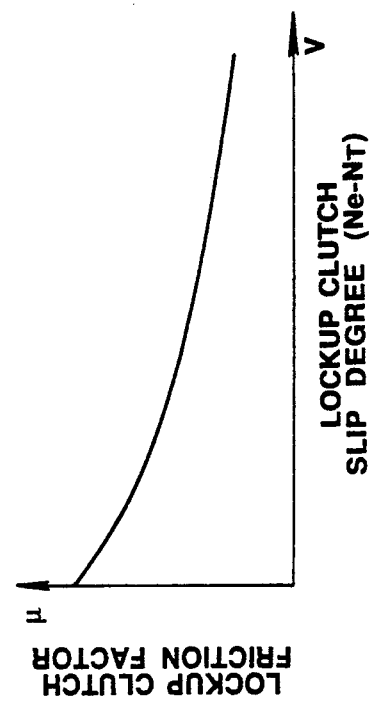
FIG. 15 is a graph of lockup clutch friction coefficient versus lockup clutch slip degree.

As can be seen from FIG. 15, the friction factor μ of the lockup clutch 18 decreases as the degree v of slip permitted in the lockup clutch 18 increases. Thus, the damper function of the lockup clutch 18 increases as the degree v of slip provided in the lockup clutch 18 increases. The slip degree v corresponds to a difference of the turbine speed $N_T$ from the engine speed Ne.

The amplitude ΔT and frequency fo of the engine output torque fluctuation are detected based upon signals fed from cylinder pressure sensors provided for the respective engine cylinders. Each of the cylinder pressure sensors is sensitive to a cylinder pressure in the corresponding one of the engine cylinders for producing a sensor signal indicative of a sensed cylinder pressure level. It is possible, with the use of the cylinder pressure sensors, to preestimate vibrations excited to cause the judder and sympathetic sound. This is effective to obviate the undesirable vibrations before they occur.

Although the invention has been described in connection with a lockup clutch control apparatus arranged to change the degree of slip permitted in the lockup clutch when the frequency fo of fluctuation of the engine output torque is in the judder frequency range or when the frequency fo is in the sympathetic sound frequency range, it is to be noted that the lockup clutch control apparatus may be arranged to change the lockup clutch slip degree so as to obviate the judder only. Similarly, the lockup clutch control apparatus may be arranged to change the lockup clutch slip degree so as to obviate the sympathetic sound only. Alternatively, the lockup clutch control apparatus may be arranged to change the lockup clutch slip degree when the frequency fo is in a predetermined range tending to excite vibrations other than the judder and sympathetic sound. In addition, the lockup clutch control apparatus may be arranged to change the lockup clutch slip degree when the amplitude of fluctuation of the engine output torque exceeds a predetermined value.

The engine 10 shown is a V-six engine. The particular engine shown is only for illustrative purpose and the invention could be readily applied to any multi-cylinder engines.

What is claimed is:

1. An apparatus for controlling a lockup clutch provided in an automatic transmission of an automotive vehicle including an internal combustion engine having a plurality of cylinders, comprising:
   cylinder output sensors provided for the respective engine cylinders, each of the cylinder output sensors including means sensitive to a cylinder pressure in the corresponding one of the engine cylinders for producing a sensor signal indicative of a sensed cylinder pressure level; and
   a control unit coupled to the cylinder output sensors for operating the lockup clutch to provide a controlled degree of slip therein, the control unit including means responsive to the sensor signals from the respective cylinder output sensors for calculating an amplitude of engine output torque fluctuation resulting from different combustion efficiencies in the engine cylinders, and means for changing the degree of slip provided in the lockup clutch when the calculated amplitude exceeds a predetermined value.

2. The lockup clutch control apparatus as claimed in claim 1, wherein the control unit includes means for sampling values of each of the sensor signals at uniform intervals, means for summing the sampled values to provide a cylinder output calculated for the corresponding one of the engine cylinders, means for detecting maximum and minimum values of the calculated cylinder outputs, means for calculating a difference between the detected maximum and minimum values, and means for converting the calculated difference into the amplitude of the engine output torque fluctuation.

3. The lockup clutch control apparatus as claimed in claim 1, wherein the control unit includes means responsive to the sensor signals from the respective cylinder output sensors for calculating a frequency of the engine output torque fluctuation, means producing a first command signal when the calculated frequency is in a first predetermined range tending to excite vibrations on the vehicle with the lockup clutch being operated in a slip lockup mode permitting a controlled degree of slip therein, and means responsive to the first command signal for changing the degree of slip permitted in the lockup clutch.

4. The lockup clutch control apparatus as claimed in claim 3, wherein the first frequency range extends from about 10 Hz to about 18 Hz.

5. The lockup clutch control apparatus as claimed in claim 3, wherein the control unit includes means for producing a second command signal when the calculated frequency is in a second predetermined range tending to excite sympathetic sounds with the lockup clutch being operated in a complete lockup mode providing a complete mechanical connection therein, and means responsive to the second command signal for shifting the lockup clutch from the complete lockup mode into a slip lockup mode.

6. The lockup clutch control apparatus as claimed in claim 5, wherein the second frequency range extends from about 50 Hz to about 58 Hz.

7. The lockup clutch control apparatus as claimed in claim 1, wherein the control unit includes means responsive to the sensor signals from the respective cylinder output sensors for calculating a frequency of the engine output torque fluctuation, means producing a command signal when the calculated frequency is in a predetermined range tending to excite vibrations on the vehicle with the lockup clutch being operated in a complete lockup mode providing a complete mechanical connection therein, and means responsive to the command signal for shifting the lockup clutch from the complete lockup mode into a slip lockup mode permitting a controlled degree of slip in the lockup clutch.

8. The lockup clutch control apparatus as claimed in claim 7, wherein the first frequency range extends from about 50 Hz to about 58 Hz.

9. The lockup clutch control apparatus as claimed in claim 1, wherein each of the cylinder output sensors comprises means sensitive to a cylinder pressure in the corresponding one of the engine cylinders for producing a sensor signal indicative of a sensed cylinder pressure level.

* * * * *